United States Patent
O et al.

(10) Patent No.: US 11,567,692 B2
(45) Date of Patent: Jan. 31, 2023

(54) MEMORY DEVICE INCLUDING INTERFACE CIRCUIT FOR DATA CONVERSION ACCORDING TO DIFFERENT ENDIAN FORMATS

(71) Applicant: Samsung Electronics Co., Ltd., Suwon-si (KR)

(72) Inventors: Seongil O, Suwon-si (KR); Jongpil Son, Seongnam-si (KR); Kyomin Sohn, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/213,732

(22) Filed: Mar. 26, 2021

(65) Prior Publication Data

US 2021/0365203 A1 Nov. 25, 2021

(30) Foreign Application Priority Data

May 19, 2020 (KR) .......................... 10-2020-0059971

(51) Int. Cl.
*G06F 3/06* (2006.01)

(52) U.S. Cl.
CPC ............ *G06F 3/0655* (2013.01); *G06F 3/061* (2013.01); *G06F 3/0673* (2013.01)

(58) Field of Classification Search
CPC ...... G06F 3/0655; G06F 3/061; G06F 3/0673; G06F 13/4013; G06F 3/0661; G06F 3/0679; G06F 13/1684; G06F 13/1689; G06F 13/387

See application file for complete search history.

(56) References Cited

U.S. PATENT DOCUMENTS

| | | | |
|---|---|---|---|
| 6,424,347 B1 | 7/2002 | Kwon | |
| 6,567,884 B1 * | 5/2003 | Rezeanu | G06F 13/4013 |
| | | | 711/201 |
| 6,725,369 B1 | 4/2004 | Farmer et al. | |
| 8,145,804 B2 | 3/2012 | Flachs et al. | |
| 8,659,608 B2 | 2/2014 | MacInnis et al. | |

(Continued)

FOREIGN PATENT DOCUMENTS

| | | |
|---|---|---|
| KR | 1019930007042 | 7/1993 |
| TW | I610222 B | 1/2018 |

OTHER PUBLICATIONS

Taiwanese Office Action dated Apr. 26, 2022 issued in Taiwanese Patent Application No. 110117106.

*Primary Examiner* — Zhuo H Li
(74) *Attorney, Agent, or Firm* — Harness, Dickey & Pierce, P.L.C.

(57) ABSTRACT

A memory device including an interface circuit for data conversion according to different endian formats includes an interface circuit that performs data conversion with hardware in a data transfer path inside the memory device in accordance with a memory bank, a processing element (PE), and an endian format of a host device. The interface circuit is (i) between a memory physical layer interface (PHY) region and a serializer/deserializer (SERDES) region, (ii) between the SERDES region and the memory bank or the PE, (iii) between the SERDES region and a bank group input/output line coupled to a bank group including a number of memory banks, and (iv) between the PE and bank local input/output lines coupled to the memory bank.

20 Claims, 15 Drawing Sheets

(56) References Cited

U.S. PATENT DOCUMENTS

| | | |
|---|---|---|
| 9,323,633 B2 | 4/2016 | Brambilla et al. |
| 9,348,784 B2 | 5/2016 | Noyes |
| 10,140,207 B2 | 11/2018 | Sakugawa et al. |
| 2007/0070778 A1* | 3/2007 | Do ................... G11C 29/48 |
| | | 365/230.05 |
| 2009/0128572 A1 | 5/2009 | MacInnis et al. |
| 2012/0239898 A1* | 9/2012 | Ware ................ G06F 13/4234 |
| | | 711/E12.001 |
| 2016/0034227 A1 | 2/2016 | Olbrich et al. |
| 2020/0294575 A1 | 9/2020 | O et al. |

* cited by examiner

MEMORY DEVICE INCLUDING INTERFACE CIRCUIT FOR DATA CONVERSION ACCORDING TO DIFFERENT ENDIAN FORMATS

CROSS-REFERENCE TO RELATED APPLICATION

This application claims the benefit of Korean Patent Application No. 10-2020-0059971, filed on May 19, 2020, in the Korean Intellectual Property Office, the disclosure of which is incorporated herein in its entirety by reference.

BACKGROUND

The inventive concepts relate to memory devices, and more particularly, to memory devices including an interface circuit for data conversion according to an endian format.

Applications such as higher performance and/or graphics algorithms are data-intensive and/or computation-intensive. Machine learning applications, such as neural networks, may include a large number of operations, including a large amount of computational and memory requirements. Therefore, machine learning applications require a computing system with large computational and memory capabilities to more accurately train or learn different data sets. To perform some of computational operations of a computing system as internal processing, a processor-in-memory (PIM) type processor device is being developed. Through the internal processing of a memory device, the computational operation load of a computing system may be reduced.

A high bandwidth memory (HBM) is a high performance random access memory (RAM) interface for 3D stacked dynamic RAM (DRAM). The HBM may be used for memory-centric and computationally intensive neural networks or other artificial intelligence (AI). This is due to an increase in training data set size, an increase in model parameters, and an increase in intermediate results of processing. In addition, the HBM is configured to execute a PIM function, and may include processing elements (PEs) that perform internal processing, such as arithmetic computations such as addition and multiplication, and logical computations such as exclusive OR (XOR).

The HBM may transmit and receive data through a data bus based on a command from a host using the HBM. The data bus may include, for example, a bus of 64 bits where bytes are regarded as atomic units and may be split into byte-wide lanes. However, a bus endian used by the data bus in the host may be different from a bus endian used by the HBM. For example, the host may use a big-endian bus, whereas the HBM may use a little-endian bus.

SUMMARY

The inventive concepts provide data conversion between different bus endian formats for data invariance.

The inventive concepts provide a memory device including an interface circuit for data conversion according to different endian formats.

According to an aspect of the inventive concepts, there is provided a memory device including a memory bank; a processing element (PE) coupled to the memory bank and configured to perform computation processing; a serializer/deserializer (SERDES) region including SERDES configured to perform an operation of parallelizing a serial data stream received from a host device external to the memory device, and perform an operation of serializing a parallel data stream output from the memory bank or the PE; and an interface circuit including a data transfer path related to the memory bank, the PE, and the SERDES, and configured to allow the memory device to perform data conversion in the data transfer path based on a control signal set in accordance with an endian format of the host device.

According to another aspect of the inventive concepts, there is provided a memory device including a memory bank; a serializer/deserializer (SERDES) region including SERDES configured to perform an operation of parallelizing a serial data stream received from a host device external to the memory device, and perform an operation of serializing a parallel data stream output from the memory bank; and an interface circuit including a data transfer path related to the memory bank and the SERDES, coupled to the SERDES region, and configured to allow the memory device to perform data conversion in the data transfer path based on a control signal set in accordance with an endian format of the host device.

According to another aspect of the inventive concepts, there is provided a method of operating a memory device including an interface circuit configured to adjust an endian format between a host device and the memory device, including receiving a serial data stream of a first endian format from the host device; parallelizing the serial data stream with first data; and the interface circuit converting the serial data stream to a second endian format of the memory device or converting the parallelized first data to the second endian format based on a control signal.

BRIEF DESCRIPTION OF THE DRAWINGS

Example embodiments of the inventive concepts will be more clearly understood from the following detailed description taken in conjunction with the accompanying drawings in which:

FIGS. 5A to 5C are circuit diagrams implementing the D2D MUX of FIG. 3;

DETAILED DESCRIPTION OF EXAMPLE EMBODIMENTS

Figure 1:
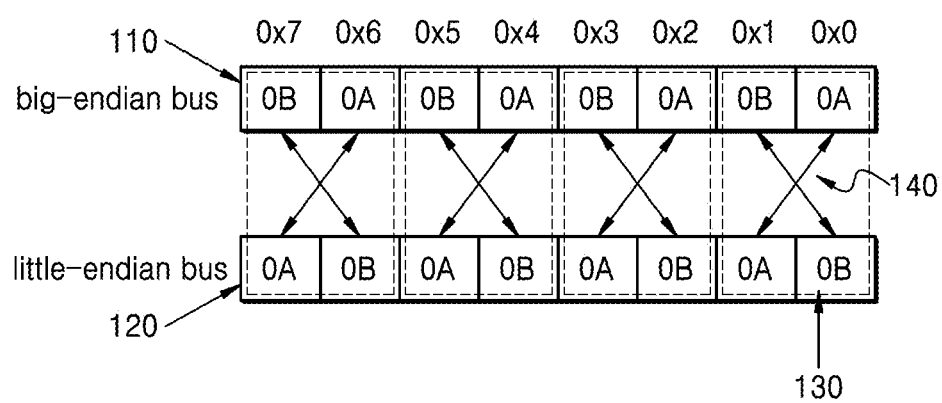
FIG. 1 is a block diagram illustrating data conversion according to example embodiments of the inventive concepts.

FIG. 1 is a block diagram illustrating data conversion according to example embodiments of the inventive concepts.

Figure 2:
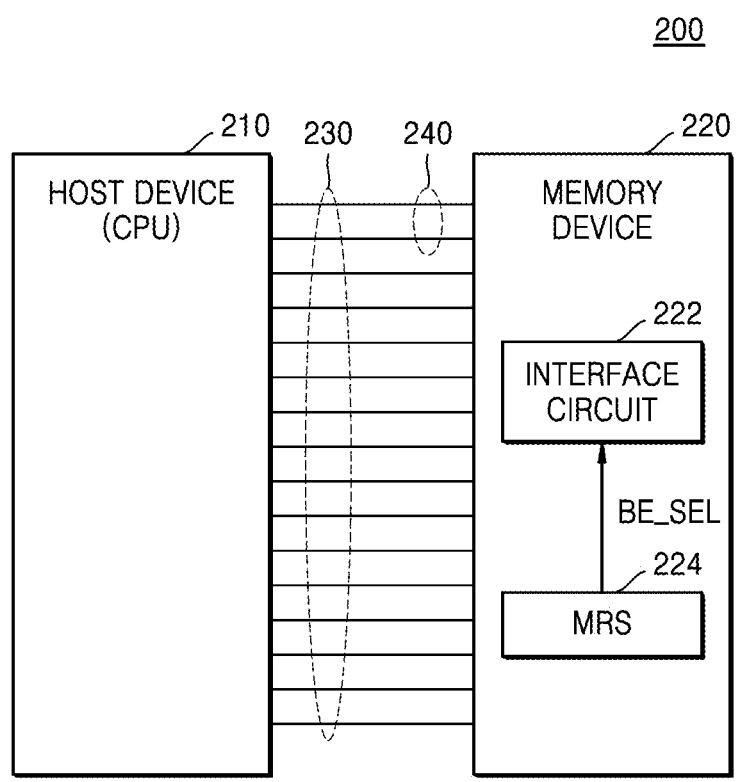
FIG. 2 is a block diagram of a system with data conversion according to example embodiments of the inventive concepts.

Referring to FIG. 1, two types of bus endians including a big-endian bus 110 and a little-endian bus 120 are shown. For example, it is assumed that data of 64 bits is transmitted over a data bus 230 (FIG. 2). For simplicity of illustration, FIG. 1 shows a configuration of the data of 64 bits, that is, 8 bytes, but is not limited thereto, and other configurations are possible. The data of 64 bits corresponds to the data size transmitted from a host device (or a CPU 210) that will be described with respect to FIGS. 2 and 7. The data of 8 bytes may be indexed as hexa codes 0x0 to 0x7, respectively.

In a data bus structure, a first byte of 0x0 indexing may be placed in the rightmost byte or digits, and an 8th byte of 0x7 indexing may be placed in the leftmost byte or digits. For convenience of description, an example in which each of the data of 8 bytes may include 1 byte including 0x0A code bits or 1 byte including 0x0B code bits, that is, any one of 2 bytes of 0x0A, 0x0B code bits is described. In some example embodiments of the inventive concepts, 2 bytes will be described as a data conversion unit 130.

In the big-endian bus 110, the 2 bytes of 0x0A and 0x0B code bits are placed from the digits located to the right of the data conversion unit 130, that is, the 0x0A code bits are placed in 0x0 indexing, and 0x0B code bits are placed in 0x1 indexing. Similarly, the 0x0A code bits are placed in 0x2 indexing and the 0x0B code bits are placed in 0x3 indexing. The 0x0A code bits are placed in 0x4 indexing, the 0x0B code bits are placed in 0x5 indexing, the 0x0A code bits are placed in 0x6 indexing, and the 0x0B code bits are placed in 0x7 indexing.

In the little-endian bus 120, the 2 bytes of 0x0A and 0x0B code bits are placed from the digits located to the left of the data bus conversion unit 130, e.g., the 0x0A code bits are placed in 0x1 indexing, and 0x0B code bits are placed in 0x0 indexing. Similarly, the 0x0A code bits are placed in 0x3 indexing, and the 0x0B code bits are placed in 0x2 indexing. The 0x0A code bits are placed in 0x5 indexing, the 0x0B code bits are placed in 0x4 indexing, the 0x0A code bits are placed in 0x7 indexing, and the 0x0B code bits are placed in 0x6 indexing.

In an environment where the big-endian bus 110 and the little-endian bus 120 are mixed, data conversion 140 is required for endian coincidence. When a process of a host uses the big-endian bus 110, and a memory device connected to the processor uses the little-endian bus 120, the data conversion 140 is performed by the memory device in a software manner. This is because the processor processes data in its own big-endian bus 110 format. While the memory device performs the data conversion 140, a series of shifts and swaps are required. Such software manipulation consumes a lot of memory space and time, which may cause deterioration in the performance of the memory device. Accordingly, when the memory device may perform the data conversion 140 with hardware, and such a facility is possible, it will be beneficial to improve the performance of the memory device.

FIG. 2 is a block diagram of a system 200 with data conversion according to example embodiments of the inventive concepts.

Referring to FIG. 2, in the system 200, the host device 210 and a memory device 220 may communicate with each other using various protocols, for example, an interface protocol such as peripheral component interconnect-express (PCI-E), advanced technology attachment (ATA), serial ATA (SATA), parallel ATA (PATA), or serial attached SCSI (SAS). In addition, various other interface protocols, such as universal serial bus (USB), multi-media card (MMC), enhanced small disk interface (ESDI), or integrated drive electronics (IDE), etc. may be applied to the protocol between the host device 210 and the memory device 220.

Data transmission between the host device 210 and the memory device 220 is performed in the form of data signals, that is, data bits, which are driven in parallel channels 240 of the data bus 230. The host device 210 may generate and transmit the data bits to the memory device 220 through the data bus 230. The host device 210 is a functional block that performs computer operations in the system 200, and may correspond to a central processing unit (CPU), a graphics processing unit (GPU), a digital signal processor (DSP) or an application processor (AP). In the specification, the host device 210 may be referred to as the CPU 210.

The CPU 210 may be configured to execute instructions or software, firmware, or pieces of combinations thereof executable by one or more machines. The CPU 210 may include an arbitrary number of processor cores. For example, the CPU 210 may include a single-core or a multi-core such as a dual-core, a quad-core, a hexa-core, etc. Although the system 200 including one CPU 210 is illustrated in FIG. 2, according to some example embodiments, the system 200 may include a plurality of CPUs.

The data bus 230 may be a bidirectional data bus, and in some example embodiments, the memory device 220 may generate and transmit the data bits to the host device 210 through the data bus 230. The data bus 230 may include parallel conductive lines called channels 240 of which end portions are respectively coupled to pins of the host and memory devices 210 and 220. The term "pin" broadly refers to an electrical interconnection to an integrated circuit, and may include, for example, another electrical contact point on a pad or the integrated circuit. The data bus 230 may include an arbitrary number of channels 240, and the number may include, for example, 2, 4, 8, 16, 32 or 64 channels.

The channel 240 may configure independent interfaces between the CPU 210 and the memory device 220. For example, when the memory device 220 is implemented in an HBM, each of DRAM dies 621 to 624 (FIG. 6) stacked in the HBM may include 2 channels, each channel (e.g., CH6, FIG. 6) may include 2 pseudo channels (e.g., CH6a and CH6b, FIG. 6), and each pseudo channel may include 64 conductive lines. Accordingly, each of the HBM DRAM dies 621 to 624 may include 4 pseudo channels and include 256 conductive lines. The data bus 230 may be coupled to 8 channels 240 through an organization associated with an HBM architecture.

Some examples may be described using the expression "connected" and/or "coupled" along with their derivatives. These terms are not necessarily intended as synonyms for each other. For example, descriptions using the terms "connected" and/or "coupled" may indicate that two or more elements are in direct physical or electrical contact with each other. In addition, the terms "connected" and/or "coupled"

may also mean that two or more elements are not in direct contact with each other but still cooperate or interact with each other.

The data bus 230 may be coupled to transfer the data bits to an interface circuit 222 that is one of hardware components of the memory device 220. The interface circuit 222 may receive data from the data bus 230 and perform data conversion on the received data in accordance with a big-endian format of the host device 210. The memory device 220 may include various data paths therein, and the interface circuit 222 may perform data conversion based on a control signal BE_SEL in a predetermined or alternatively, desired data path.

The control signal BE_SEL may be provided in a mode register set (MRS) 224 of the memory device 220. The MRS 224 may be programmed with appropriate bit values provided to an address bus of a memory interface when an MRS command is issued from the CPU 210. A plurality of operation options, various functions, characteristics, and modes of the memory device 220 may be set in the MRS 224. In the inventive concepts, the MRS 224 may include the special control signal BE_SEL that sets whether to change to the big-endian format. For example, the MRS 224 may provide the logic high level control signal BE_SEL when indicating the change to the big-endian format.

According to some example embodiments, the control signal BE_SEL may be provided using a non-volatile memory device in the memory device 220, for example, an anti-fuse. The anti-fuse is a resistive fuse device having opposite electrical characteristics to a fuse device, and having a higher resistance value in a non-programmed state, while having a lower resistance value in a programmed state. For example, when the anti-fuse is programmed, the control signal BE_SEL may indicate the change to the big-endian format.

Figure 3:
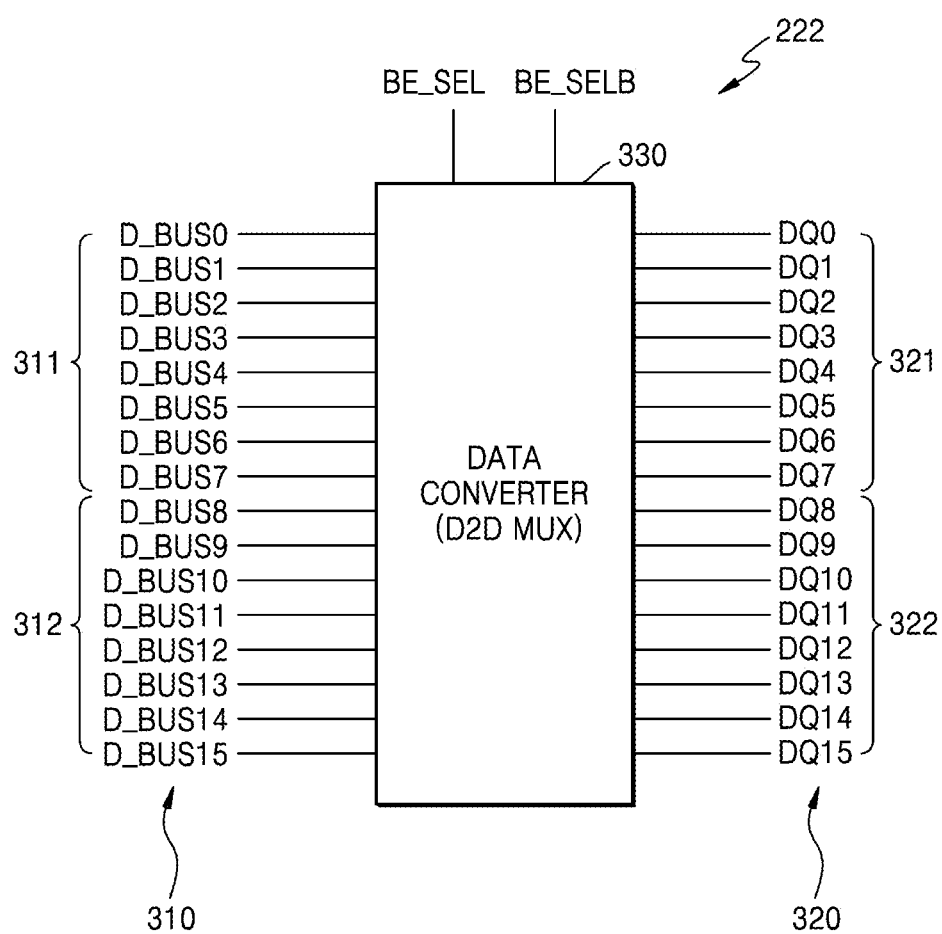
FIG. 3 is a block diagram illustrating an interface circuit according to example embodiments of the inventive concepts.

FIG. 3 is a block diagram illustrating an interface circuit 222 according to some example embodiments of the inventive concepts.

Referring to FIGS. 2 and 3, the interface circuit 222 may include a data converter 330 connected between a first data bus 310 and a second data bus 320. The first data bus 310 indicates data lines D_BUS [15:0] coupled to the CPU 210, and the second data bus 320 indicates data lines DQ[0:15] coupled to the memory device 220.

The data converter 330 selectively reconfigures and transfers an endian format of the second data bus 320 in accordance with a specific endian format of the first data bus 310 according to control signals BE_SEL and BE_SELB. The data converter 330 may reconfigure the endian format of the second data bus 320 to a big-endian format when the first data bus 310 is in the big-endian format and may reconfigure the endian format of the second data bus 320 to a little-endian format when the first data bus 310 is in the little-endian format, in response to the control signals BE_SEL and BE_SELB.

The control signal BE_SEL may determine whether the data converter 330 reconfigures (the endian format of the second data bus 320) to the big-endian format. The control signal BE_SELB is a signal having a logic level opposite to that of the control signal BE_SEL.

The first data bus 310 may include D_BUS0 to D_BUS7 lines transferring a first byte 311 and D_BUS8 to D_BUS15 lines transferring a second byte 312, and the second data bus 320 may include DQ0 to DQ7 lines transferring a first byte 321 and DQ8 to DQ15 lines transferring a second byte 322. When the first data bus 310 is in the little-endian format and the control signal BE_SEL does not instruct reconfiguration to the big-endian format, the data converter 330 may pass the first byte 311 of the first data bus 310 to the first byte 321 of the second data bus 320 and pass the second byte 312 of the first data bus 310 to the second byte 322 of the second data bus 320. Also, the data converter 330 may pass the first byte 321 of the second data bus 320 to the first byte 311 of the first data bus 310 and pass the second byte 322 of the second data bus 320 to the second byte 312 of the first data bus 310.

When the first data bus 310 is in the big-endian format and the control signal BE_SEL instructs reconfiguration to the big-endian format, the data converter 330 may reconfigure and transfer the first byte 311 of the first data bus 310 to a second byte 322 of the second data bus 320 and reconfigure and transfer the second byte 312 of the first data bus 310 to the first byte 321 of the second data bus 320. Also, the data converter 330 may reconfigure and transfer the first byte 321 of the second data bus 320 to the second byte 312 of the first data bus 310 and reconfigure and transfer the second byte 322 of the second data bus 320 to the first byte 311 of the first data bus 310.

The second byte 322 performs the function of selectively exchanging the first byte 311 and the second byte 312 of the first data bus 310 and the first byte 321 and the second byte 322 of the second data bus 320, which may be actually physically implemented in the form of a data-to-data multiplexer (D2D MUX). Hereinafter, for convenience of description, the data converter 330 will be referred to as a D2D MUX and will be described as the D2D MUX 330. In addition, it is assumed that the first data bus 310 transfers data in the big-endian format, the second data bus 320 transfers data in the little-endian format, and a logic high level of the control signal BE_SEL controls the D2D MUX 330 to reconfiguration to the big-endian format.

Figure 4:
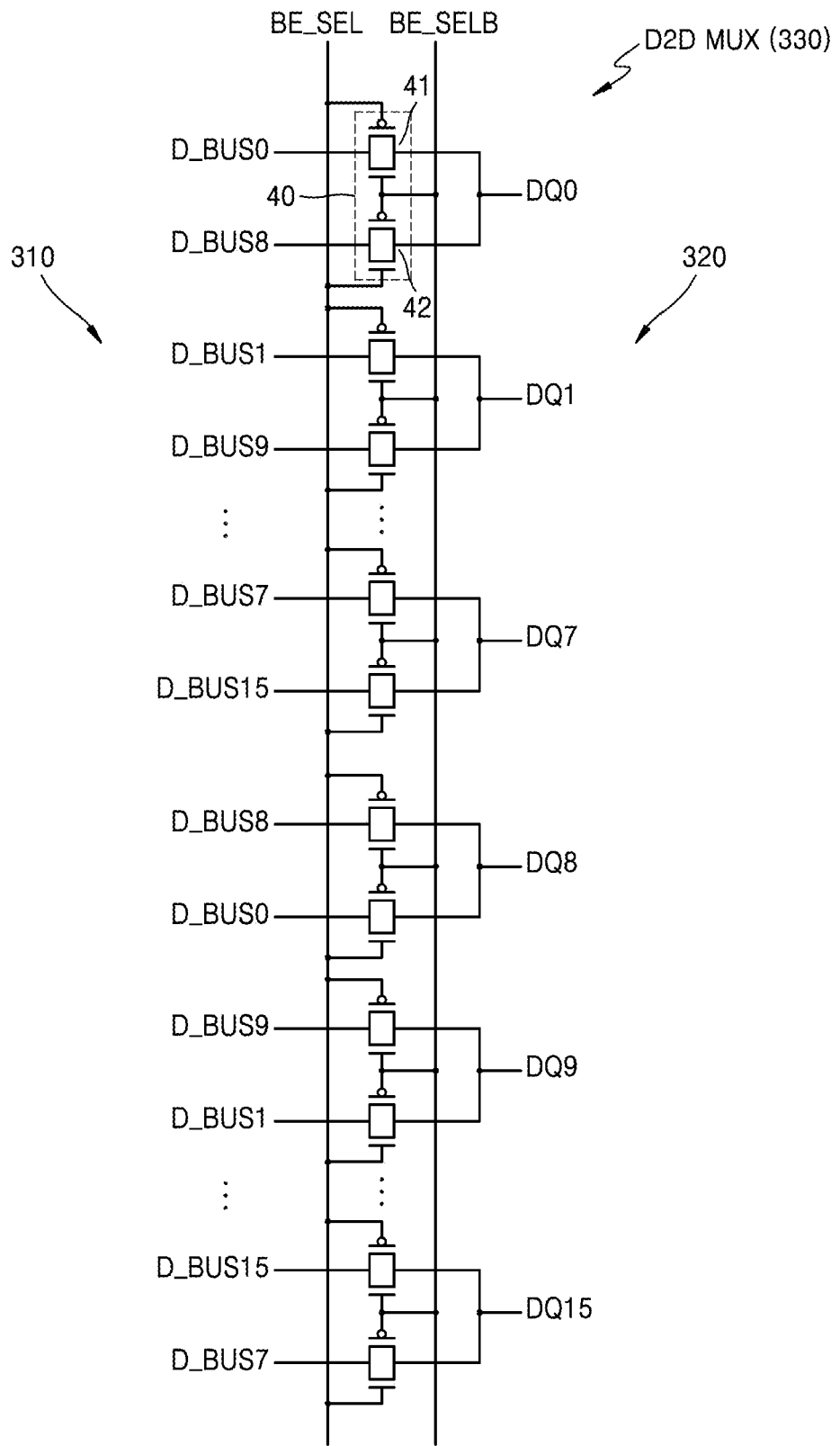
FIG. 4 is a circuit diagram implementing a data converter (a data-to-data (D2D) multiplexer (MUX)) of FIG. 3.

FIG. 4 is a circuit diagram implementing the D2D MUX 330 of FIG. 3.

Referring to FIGS. 3 and 4, the D2D MUX 330 may include 16 transfer gate circuits 40. The transfer gate circuits 40 are respectively partitioned to one bit line of the first byte 311 of the first data bus 310, one bit line of the second byte 312 of the first data bus 310, and one bit line of the first or second byte 321 or 322 of the second data bus 320. For example, the transfer gate circuit 40 may include a first transfer gate 41 connected between the D_BUS0 line and the DQ0 line, and a second transfer gate 42 connected between the D_BUS8 line and the DQ0 line. The first transfer gate 41 connects the D_BUS0 line to the DQ0 line in response to a logic low level of the control signal BE_SEL, and the second transfer gate 42 connects the D_BUS8 line to the DQ0 line in response to a logic high level of the control signal BE_SEL. The other transfer gate circuits 40 operate similarly.

Accordingly, when the control signal BE_SEL is at the logic low level, the D2D MUX 330 passes the first byte 311 of the first data bus 310 to the first byte 321 of the second data bus 320, passes the second byte 312 of the first data bus 310 to the second byte 322 of the second data bus 320, passes the first byte 311 of the second data bus 320 to the first byte 311 of the first data bus 310, and passes the second byte 322 of the second data bus 320 to the second byte 312 of the first data bus 310. When the control signal BIG_SEL is at the logic high level, the D2D MUX 330 reconfigures and transfers the second byte 312 of the first data bus 310 to the first byte 321 of the second data bus 320, reconfigures and transfers the first byte 311 of the first data bus 310 to the second byte 322 of the second data bus 320, reconfigures and transfers the second byte 322 of the second data bus 320 to the first byte 311 of the first data bus 310, and reconfigures and transfers the first byte 321 of the second data bus 320 to the second byte 312 of the first data bus 310.

Figure 5B:
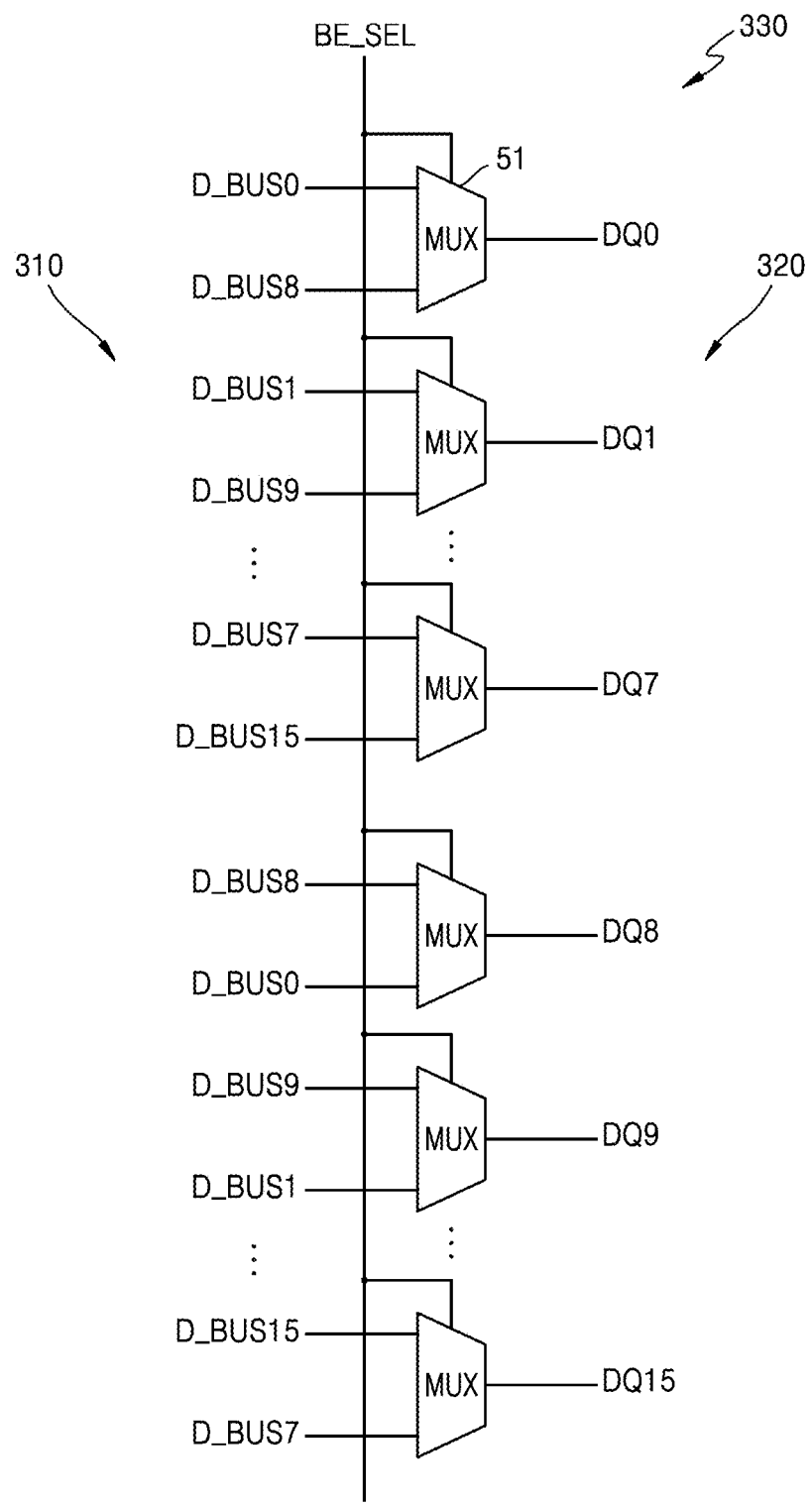
Figure 5C:
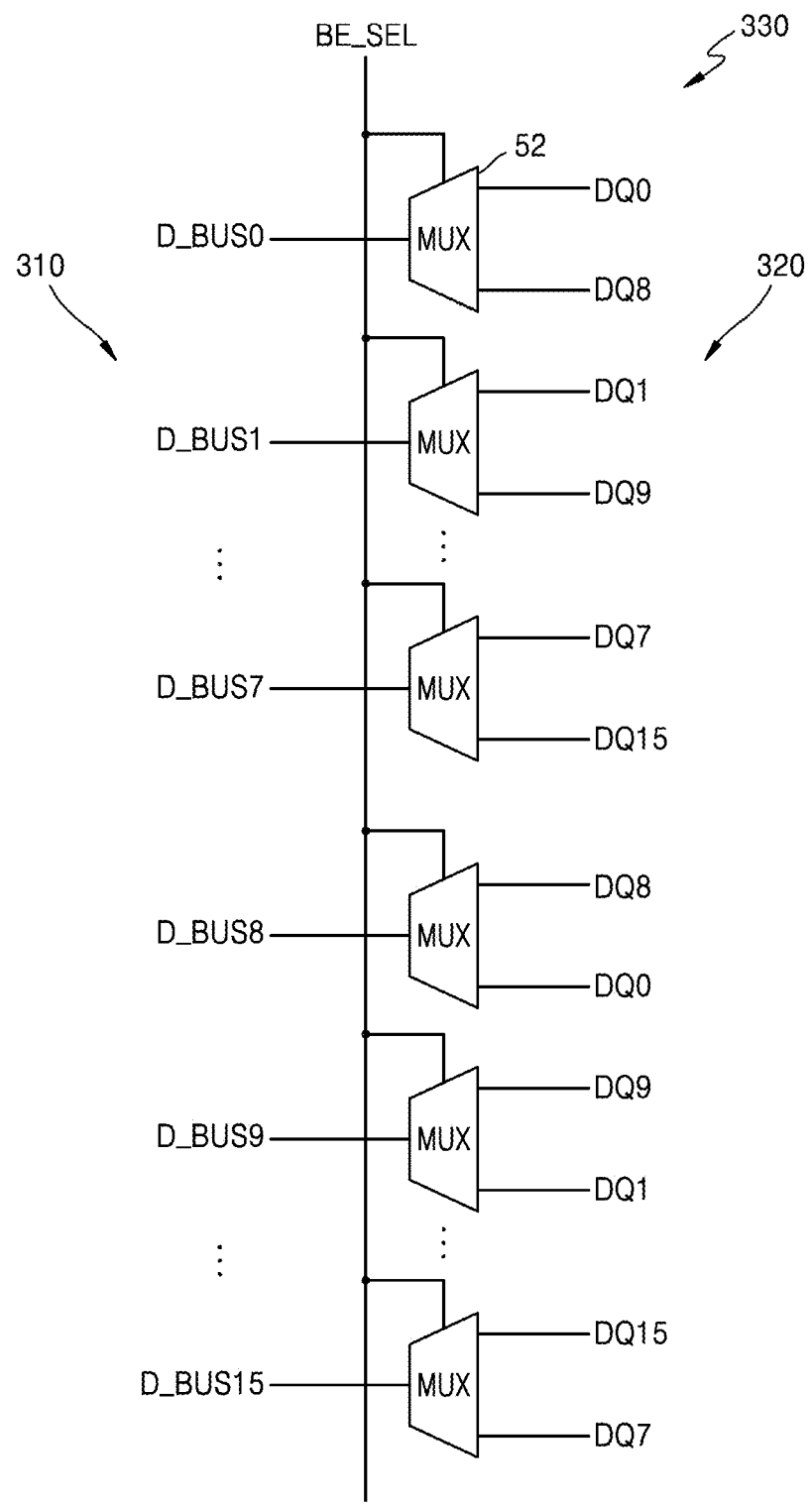

FIGS. 5A to 5C are circuit diagrams implementing the D2D MUX 330 of FIG. 3. The D2D MUX 330 of FIG. 5A may include FIGS. 5B and 5C.

Referring to FIGS. 3 and 5B, the D2D MUX 330 may include 16 first multiplexers 51. The first multiplexers 51 are respectively partitioned to one bit line of the first byte 311 of the first data bus 310, one bit line of the second byte 312 of the first data bus 310, and one bit line of the first byte 321 of the second data bus 320 or the second byte 322. For example, the first multiplexer 51 is connected between the D_BUS0 line, the D_BUS8 line, and the DQ0 line, transfers bits of the D_BUS0 line to the DQ0 line in response to a logic low level of the control signal BE_SEL, and transfers bits of the D_BUS8 line to the DQ0 line in response to a logic high level of the control signal BE_SEL. The other first multiplexers 51 operate similarly.

Accordingly, when the control signal BE_SEL is at the logic low level, the D2D MUX 330 passes the first byte 311 of the first data bus 310 to the first byte 321 of the second data bus 320 and passes the second byte 312 of the first data bus 310 to the second byte 322 of the second data bus 320. When the control signal BE_SEL is at the logic high level, the D2D MUX 330 reconfigures and transfers the second byte 312 of the first data bus 310 to the first byte 321 of the second data bus 320 and reconfigures and transfers the first byte 311 of the first data bus 310 to the second byte 322 of the second data bus 320.

Referring to FIGS. 3 and 5C, the D2D MUX 330 may include 16 second multiplexers 52. The second multiplexers 52 are respectively partitioned to one bit line of the first byte 321 of the second data bus 320, one bit line of the second byte 322 of the second data bus 320, and one bit line of the first byte 311 or the second byte 312 of the first data bus 310. For example, the second multiplexer 52 is connected between the DQ0 line, the DQ8 line and the D_BUS0 line, transfers bits of the DQ0 line to the D_BUS0 line in response to the logic low level of the control signal BE_SEL, and transfers bits of the DQ8 line to the D_BUS0 line in response to the logic high level of the control signal BE_SEL. The other second multiplexers 52 operate similarly.

Accordingly, when the control signal BE_SEL is at the logic low level, the D2D MUX 330 passes the first byte 321 of the second data bus 320 to the first byte 311 of the first data bus 310 and passes the second byte 322 of the second data bus 320 to the second byte 312 of the first data bus 310. When the control signal BE_SEL is at the logic high level, the D2D MUX 330 reconfigures and transfers the second byte 322 of the second data bus 320 to the first byte 311 of the first data bus 310, and reconfigures and transfers the first byte 321 of the second data bus 320 to the second byte 322 of the second data bus 320.

Figure 6:
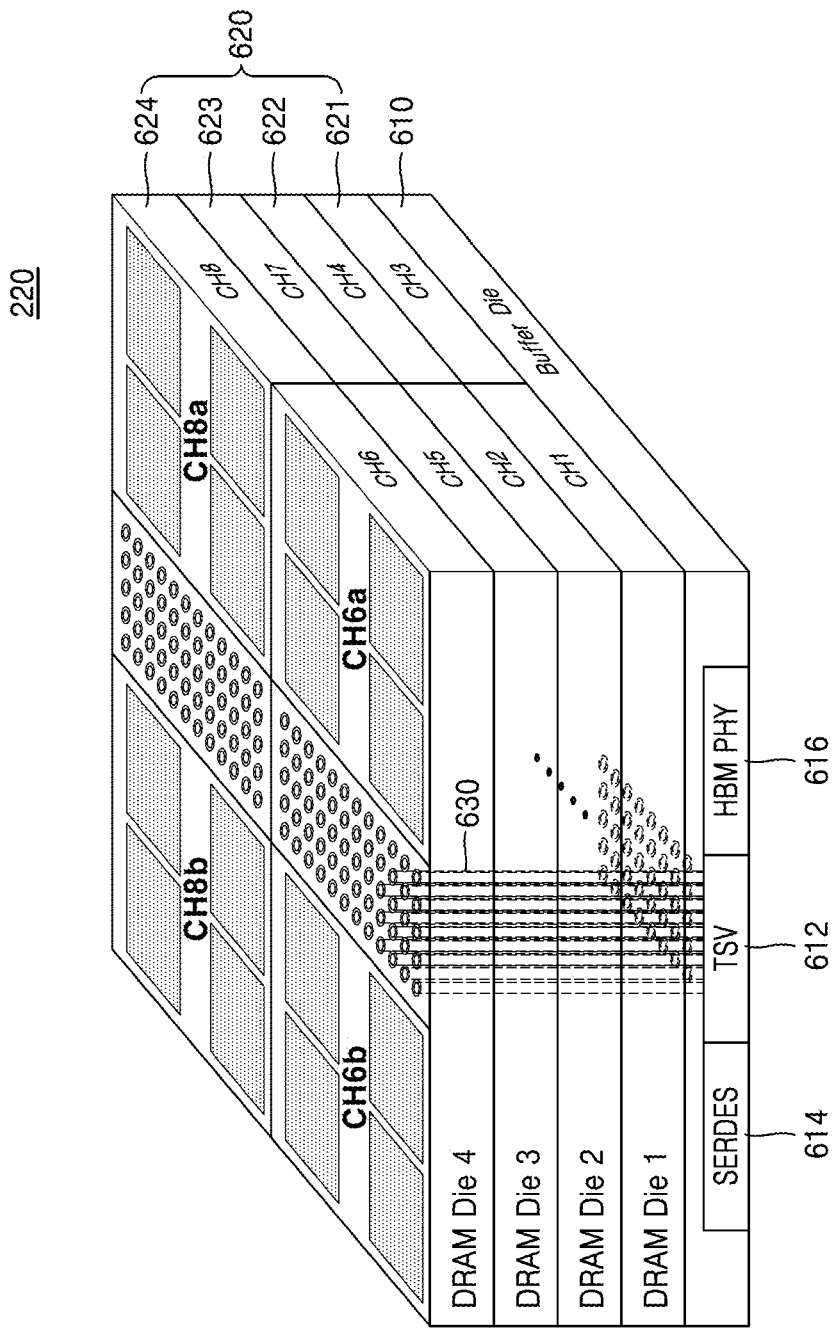
FIG. 6 is a diagram illustrating a memory device according to example embodiments of the inventive concepts.

FIG. 6 is a diagram illustrating the memory device 220 according to some example embodiments of the inventive concepts.

Referring to FIGS. 2 and 6, the memory device 220 may be an HBM including a plurality of channels CH1 to CH8 having interfaces independent of each other. The memory device 220 may include a plurality of dies including a buffer die 610 and at least one DRAM die 620 stacked on the buffer die 610. For example, the first DRAM die 621 may include the first channel CH1 and the third channel CH3, and the second DRAM die 622 may include the second channel CH2 and the fourth channel CH4, the third DRAM die 623 may include the fifth channel CH5 and the seventh channel CH7, and the fourth DRAM die 624 may include the sixth channel CH6 and the eighth channel CH8.

The buffer die 610 may communicate with the CPU 210 through conductive elements formed on the outer surface of the memory device 220, such as bumps or solder balls. The buffer die 610 may receive commands, addresses, and data from the CPU 210 and provide the received commands, addresses, and data to channels of the at least one DRAM die 620. Also, the buffer die 610 may provide data output from the channels of at least one DRAM die 620 to the CPU 210.

The memory device 220 may include a plurality of through silicon vias (TSVs) 630 penetrating the first to fourth DRAM dies 621 to 624. When each of the channels CH1 to CH8 has a bandwidth of 128 bits, the TSVs 630 may include configurations for data input and output of 1024 bits. Each of the channels CH1 to CH8 may be disposed separately from left to right, for example, in the fourth DRAM die 624, the sixth channel CH6 is divided into pseudo channels CH6a and CH6b, and the eighth channel CH8 may be divided into pseudo channels CH8a and CH8b. The TSVs 630 may be disposed between the pseudo channels CH6a and CH6b of the sixth channel CH6 and between the pseudo channels CH8a and CH8b of the eighth channel CH8.

The buffer die 610 may include a TSV region 612, a serializer/deserializer (SERDES) region 614, and/or an HBM physical layer interface, that is, an HBM PHY region 616. The TSV region 612 is a region in which the TSV 630 for communication with the at least one DRAM die 620 is formed.

The SERDES region 614 is a region that provides a SERDES interface of the Joint Electron Device Engineering Council (JEDEC) standard as the processing throughput of the CPU 210 increases and the demands for memory bandwidth increase. The SERDES region 614 may include a SERDES transmitter portion, a SERDES receiver portion, and/or a controller portion. The SERDES transmitter portion may include a parallel-to-serial circuit and a transmitter, may receive a parallel data stream, and serialize the received parallel data stream. The SERDES receiver portion may include a receiver amplifier, an equalizer, a clock and data recovery (CDR) circuit and a serial-to-parallel circuit, receive a serial data stream, and parallelize the received serial data stream. The controller portion may include registers such as an error detection circuit, an error correction circuit, and a first in first out (FIFO).

The HBM PHY region 616 may include physical or electrical layers and logical layers that are provided for signals, frequency, timing, driving, detailed operation parameters, and functionality that are required for efficient communication between the CPU 210 and the memory device 220. The HBM PHY region 616 may perform memory interfacing such as selecting rows and columns corresponding to memory cells, writing data to the memory cells, or reading the written data. The HBM PHY region 616 may support features of an HBM protocol of the JEDEC standard. For example, the HBM PHY region 616 may perform 64-bit data communication with the CPU 210.

Figure 7:
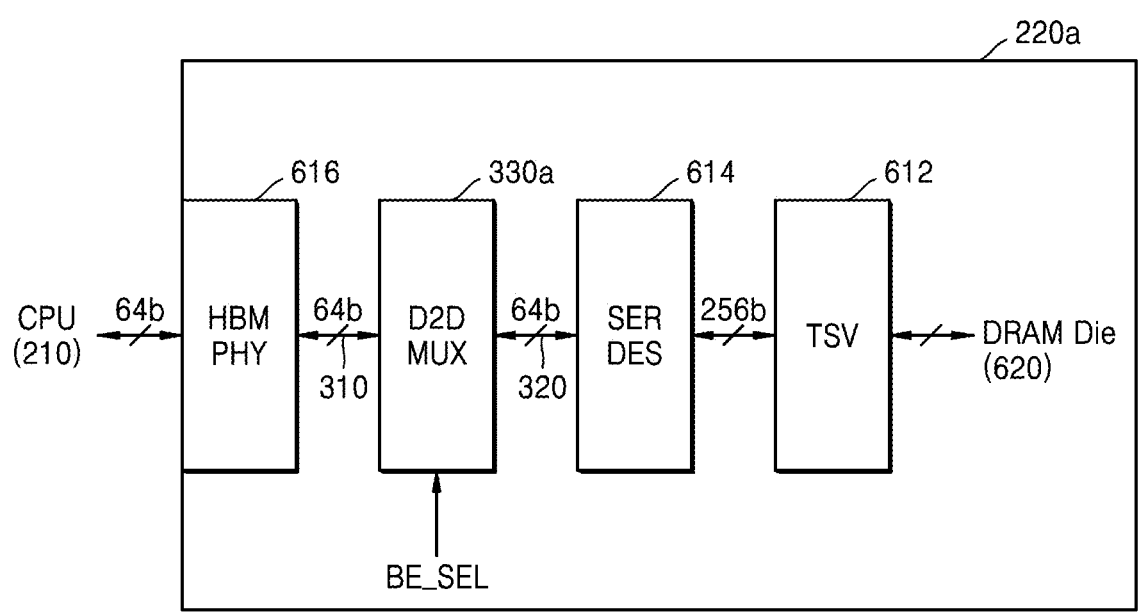
FIG. 7 is a diagram illustrating the arrangement of a D2D MUX in a memory device according to example embodiments of the inventive concepts.

FIG. 7 is a diagram illustrating the arrangement of a D2D MUX 330a in a memory device 220a according to some example embodiments of the inventive concepts. Hereinafter, subscripts (e.g., a in 220a and a in 330a) attached to the reference numerals are for distinguishing a plurality of circuits having the same function.

Referring to FIGS. 6 and 7, in the memory device 220a, the D2D MUX 330a may be disposed between the HBM PHY region 616 and the SERDES region 614. The HBM PHY region 616 may receive 64-bit input data from the CPU 210 and split the received 64-bit input data into byte wide to transfer the split 64-bit input data to the D2D MUX 330a. The D2D MUX 330a may perform data conversion on the 64-bit input data in units of 2 bytes based on a data pass or conversion operation in response to the control signal BE_SEL, and output 64-bit output data. The D2D MUX 330a may be implemented as the D2D MUX 330 of FIGS. 4 and 5A to 5C described above, and the 64-bit input data may split into 8 bytes and be carried on the first data bus 310, and the 64-bit output data may split into 8 bytes and be carried on the second data bus 320.

The D2D MUX 330a may reconfigure and transfer a first byte of the first data bus 310 to a second byte of the second data bus 320 and reconfigure and transfer a second byte of the first data bus 310 to a first byte of the second data bus 320, according to the logic high level control signal BE_SEL, like the data conversion 140 shown in FIG. 1. Similarly, the D2D MUX 330a may reconfigure and transfer a third byte of the first data bus 310 to a fourth byte of the second data bus 320, reconfigure and transfer a fourth byte of the first data bus 310 to a third byte of the second data bus 320, reconfigure and transfer a fifth byte of the first data bus 310 to a sixth byte of the second data bus 320, reconfigure and transfer a sixth byte of the first data bus 310 to a fifth byte of the second data bus 320, reconfigure and transfer a seventh byte of the first data bus 310 to an eighth byte of the second data bus 320, and reconfigure and transfer an eighth byte of the first data bus 310 to a seventh byte of the second data bus 320. That is, the D2D MUX 330a may exchange between 2 bytes of the first data bus 310 and the second data bus 320 according to the logic high level control signal BE_SEL.

The D2D MUX 330a may pass unchanged data from the first to eighth bytes of the first data bus 310 to the first to eighth bytes of the second data bus 320 according to the logic low level control signal BE_SEL.

After data conversion is performed by the D2D MUX 330a, the second data bus 320 may be coupled to the SERDES region 614. The SERDES region 614 may continuously receive 64-bit data of the second data bus 320 and convert and output the 64-bit data as 256-bit parallel data through a serial-to-parallel circuit. The 256-bit parallel data output from the SERDES region 614 may be provided to the at least one DRAM die 620 through the TSV region 612.

Figure 8:
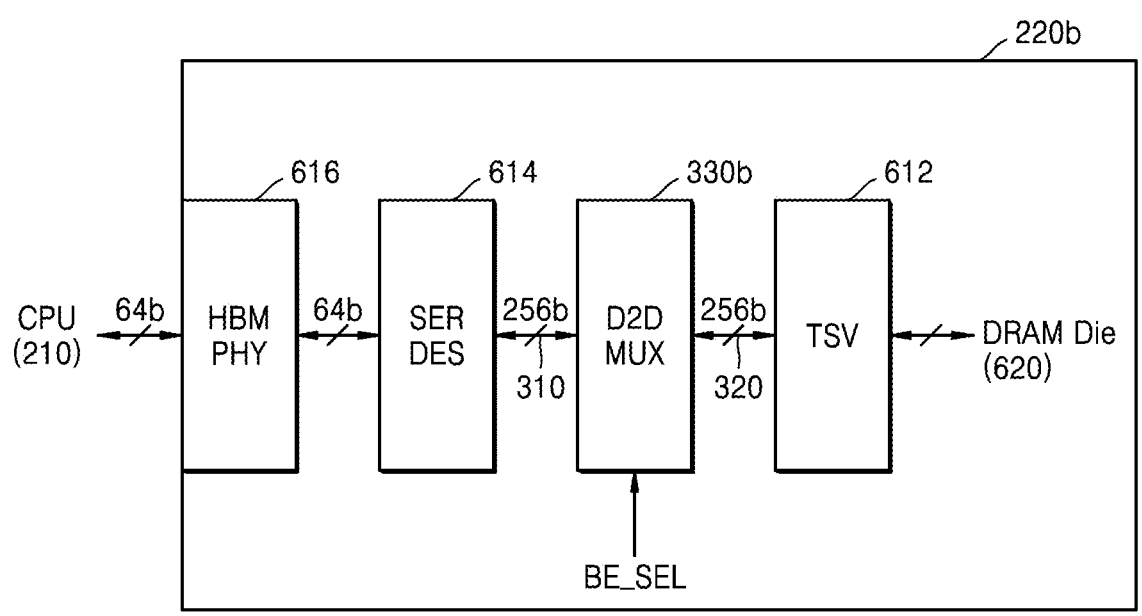
FIG. 8 is a diagram illustrating the arrangement of a D2D MUX in a memory device according to example embodiments of the inventive concepts.

FIG. 8 is a diagram illustrating the arrangement of a D2D MUX 330b in a memory device 220b according to some example embodiments of the inventive concepts. The D2D MUX 330b of FIG. 8 is different from the D2D MUX 330a of FIG. 7 in that the D2D MUX 330b is disposed between the SERDES region 614 and the TSV region 612. Hereinafter, differences between FIGS. 7 and 8 will be described.

Referring to FIGS. 6 and 8, 64-bit input data continuously received from the CPU 210 to the HBM PHY region 616 may be provided to the SERDES region 614 and converted into 256-bit parallel data. The 256-bit parallel data output from the SERDES region 614 may be transferred to the D2D MUX 330b through the first data bus 310. The D2D MUX 330b may perform data conversion on 256-bit input data based on a data pass or conversion operation performed in 2-byte units in response to the control signal BE_SEL, and output 256-bit output data through the second data bus 320. The D2D MUX 330b may be implemented as the D2D MUX 330 of FIGS. 4 and 5A to 5C described above, and the 256-bit input data may split into 16 bytes and be carried on the first data bus 310, and the 256-bit output data may split into 16 bytes and be carried on the second data bus 320.

The D2D MUX 330b may exchange between two bytes of the first data bus 310 and the second data bus 320 according to the logic high level control signal BE_SEL, that is, between first and second bytes, between third and fourth bytes, between fifth and sixth bytes, between seventh and eighth bytes, ninth and tenth bytes, between eleventh and twelfth bytes, between thirteenth and fourteenth bytes, and between fifteenth and sixteenth bytes.

The D2D MUX 330b may pass unchanged data from the first to sixteenth bytes of the first data bus 310 to the first to sixteenth bytes of the second data bus 320 according to the logic low level control signal BE_SEL.

After data bus conversion is performed by the D2D MUX 330b, the second data bus 320 may be coupled to the TSV region 612.

Because the D2D MUX 330a of FIG. 7 is coupled to the HBM PHY region 616 communicating in accordance with the operating speed of the CPU 210, for example, 1.2 GHz, the data bus conversion of a high-frequency operation suitable for the high-speed operation of the HBM PHY region 616 may be required. In contrast, because the D2D MUX 330b of FIG. 8 performs data bus conversion on 256-bit parallel data processed in the high-speed operation in the HBM PHY region 616 and the SERDES region 614, the data bus conversion of a relatively low frequency operation than the D2D MUX 330a of FIG. 7 may be sufficient to the D2D MUX 330b of FIG. 8.

The D2D MUX 330a of FIG. 7 performs data bus conversion on the 64-bit data of the first and first data buses 310 and 320, while the D2D MUX 330b of FIG. 8 performs data bus conversion on the 256-bit data of the first and first data buses 310 and 320. Because the size of the D2D MUX 330a of FIG. 7 is relatively smaller than the size of the D2D MUX 330b of FIG. 8, the D2D MUX 330a of FIG. 7 is advantageous in terms of area.

Figure 9:
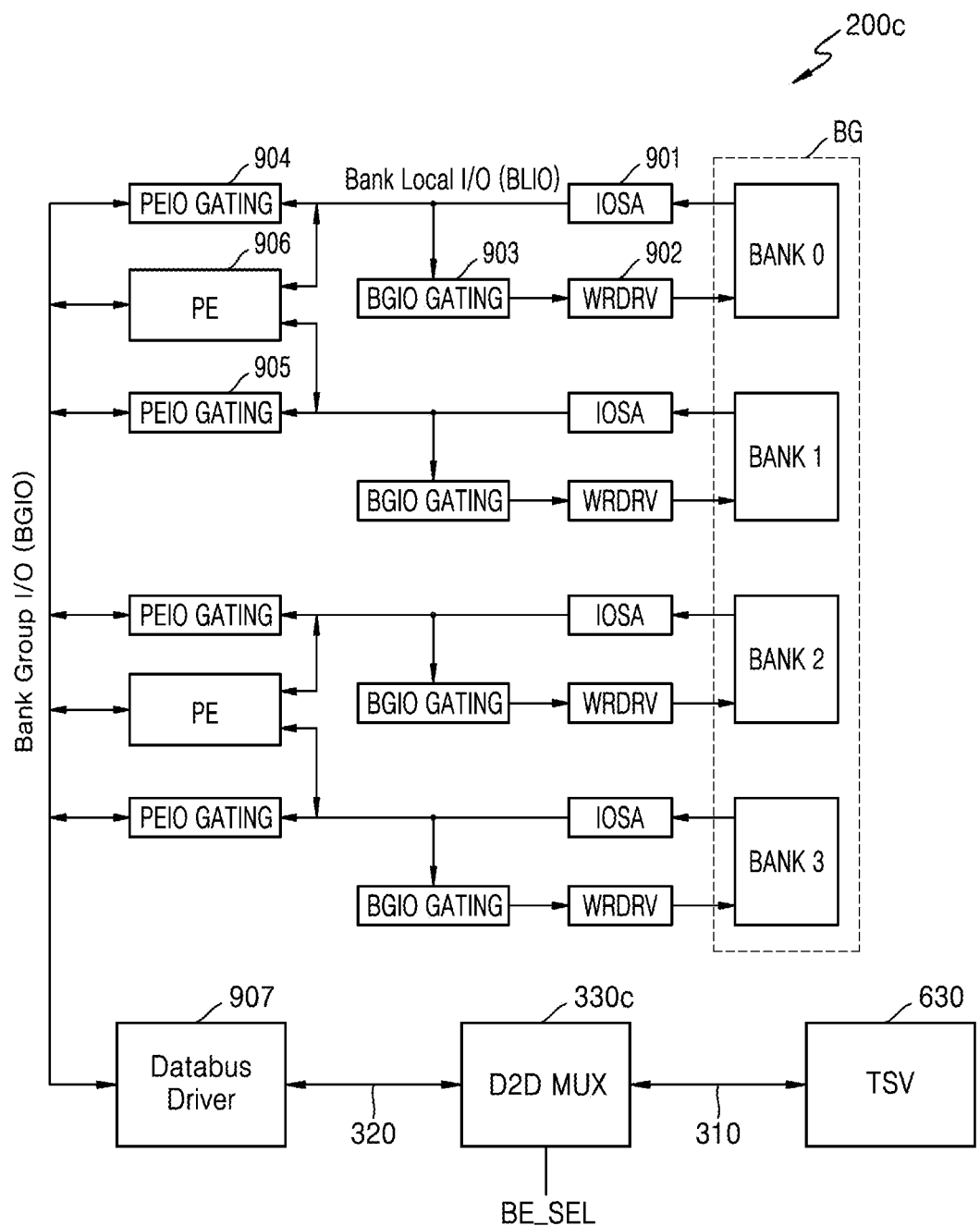
FIG. 9 is a diagram illustrating the arrangement of a D2D MUX in a memory device according to example embodiments of the inventive concepts.

FIG. 9 is a diagram illustrating the arrangement of a D2D MUX 330c in a memory device 220c according to some example embodiments of the inventive concepts. In describing the configuration and operation of the memory device 220c of FIG. 9, the configuration may correspond to the at least one DRAM die 620 in the HBM of FIG. 6. A number of hardware configurations are illustrated to describe the at least one DRAM die 620, but are not limited thereto and other configurations are possible.

Referring to FIGS. 2, 6, and 9, an example is shown that the at least one DRAM die 620 of the memory device 220c may include first to fourth banks BANK0 to BANK3 defined as one bank group BG and the first to fourth banks BANK0 to BANK3 share a bank group input/output line IO. The bank group IO BGIO may transfer data in both directions between the CPU 210 and the bank group BG. For the brevity of drawings, the bank group IO BGIO and the bank local IO BLIO are shown as one signal line, but may be actually implemented as a plurality of signal lines.

A processing element (PE) 906 may be disposed corresponding to two or more banks, may be disposed corresponding to the first and second banks BANK0 and BANK1, and may be disposed corresponding to the third and fourth banks BANK2 and BANK3. The PE 906 is a conceptual component that performs a PIM function, and may be defined to include various other components related to arithmetic computation and/or logical computation processing. For example, the PE 906 may include components that perform various functions, such as a controller that controls all operations of computation processing, an instruction memory (or an instruction queue) that stores instructions, and/or instruction decoding.

A sense amplifier 901, a write driver 902, and/or a bank group input/output gating circuit (hereinafter referred to as a BGIO gating circuit 903) may be coupled in correspondence to the first bank BANK0. Further, the sense amplifier 901 and the write driver 902 may be arranged on the bank local IO BLIO, and the BGIO gating circuit 903 may be arranged to select the data transfer direction of the bank local IO BLIO. In FIG. 9, an example is shown that the BGIO gating circuit 903 is disposed in a path through which data is transferred through the write driver 902, but the BGIO gating circuit 903 needs not be limited thereto. As another example, the BGIO gating circuit 903 may be arranged in a path through which data is output through the sense amplifier 901.

A first PE input/output (PEIO) gating circuit 904 may be disposed corresponding to the first bank BANK0, and a second PEIO gating circuit 905 may be disposed corresponding to the second bank BANK1. The first and second PEIO gating circuits 904 and 905 may be arranged to control the movement path of data in a memory operation and a computation processing operation. In the memory operation, the first PEIO gating circuit 904 may electrically connect the bank local IO BLIO to the bank group IO BGIO to transmit and receive data between the CPU 210 and the first bank BANK0, and the data may be transmitted and received between the CPU 210 and the second bank BANK1 by the second PEIO gating circuit 905. Meanwhile, during the computation processing, the first and second PEIO gating circuits 904 and 905 electrically block the bank local IO BLIO and the bank group IO BGIO to transmit and receive the data between the CPU 210 and the PE and 906, or between the PE 906 and the first and second banks BANK0 and BANK1.

The PE 906 may be disposed corresponding to the first and second banks BANK0 and BANK1. The PE 906 may perform computation processing by using at least one of data provided from the CPU 210, data read from the first and second banks BANK0 and BANK1, and information stored in a register provided in the PE 906. In some example embodiments, when the PE 906 performs computation processing using the data from the first bank BANK0, the second PEIO gating circuit 905 disposed corresponding to the second bank BANK1 may block an electrical connection between the bank group IO BGIO and the bank local IO BLIO corresponding to the second bank BANK1. In some example embodiments, when the PE 906 is shared with the first and second banks BANK0 and BANK1, a result of computation processing using data of any one bank may be stored in another bank. As an example, the data read from the first bank BANK0 may be provided to the PE 906 as an operand, and a computation result of the PE 906 may be stored in the second bank BANK1.

The bank group IO BGIO may be coupled to the D2D MUX 330c through a data bus driver 907, and the D2D MUX 330c may be coupled to the TSV 630. Data transferred to the TSV 630 of the at least one DRAM die 620 may be transferred to the D2D MUX 330c through the first data bus 310. The D2D MUX 330c may perform data bus conversion on 256-bit input data in 2-byte units based on a data pass or conversion operation in response to the control signal BE_SEL, and output 256-bit output data through the second data bus 320.

The D2D MUX 330c may be implemented as the D2D MUX 330 of FIGS. 4 and 5A to 5C described above, and the 256-bit input data may split into 16 bytes and be carried on the first data bus 310, and the 256-bit output data may split into 16 bytes and be carried on the second data bus 320. The D2D MUX 330c may exchange between two bytes in 16 bytes of 258 bits of the first data bus 310 and the second data bus 320 according to the logic high level control signal BE_SEL, that is, between first and second bytes, between third and fourth bytes, between fifth and sixth bytes, between seventh and eighth bytes, between ninth and tenth bytes, between eleventh and between twelfth bytes, between thirteenth and fourteenth bytes, and between fifteenth and sixteenth bytes. The D2D MUX 330c may pass unchanged data from the first to sixteenth bytes of the first data bus 310 to the first to sixteenth bytes of the second data bus 320 according to the logic low level control signal BE_SEL.

After data bus conversion is performed by the D2D MUX 330c, the second data bus 320 may be coupled to the bank group IO BGIO through the data bus driver 907.

The DRAM die configuration shown in FIG. 9 is provided as an example, and is not necessarily an actual DRAM die configuration. Also, the DRAM die configuration shown in FIG. 9 does not indicate or imply limitations to the inventive concepts.

Figure 10:
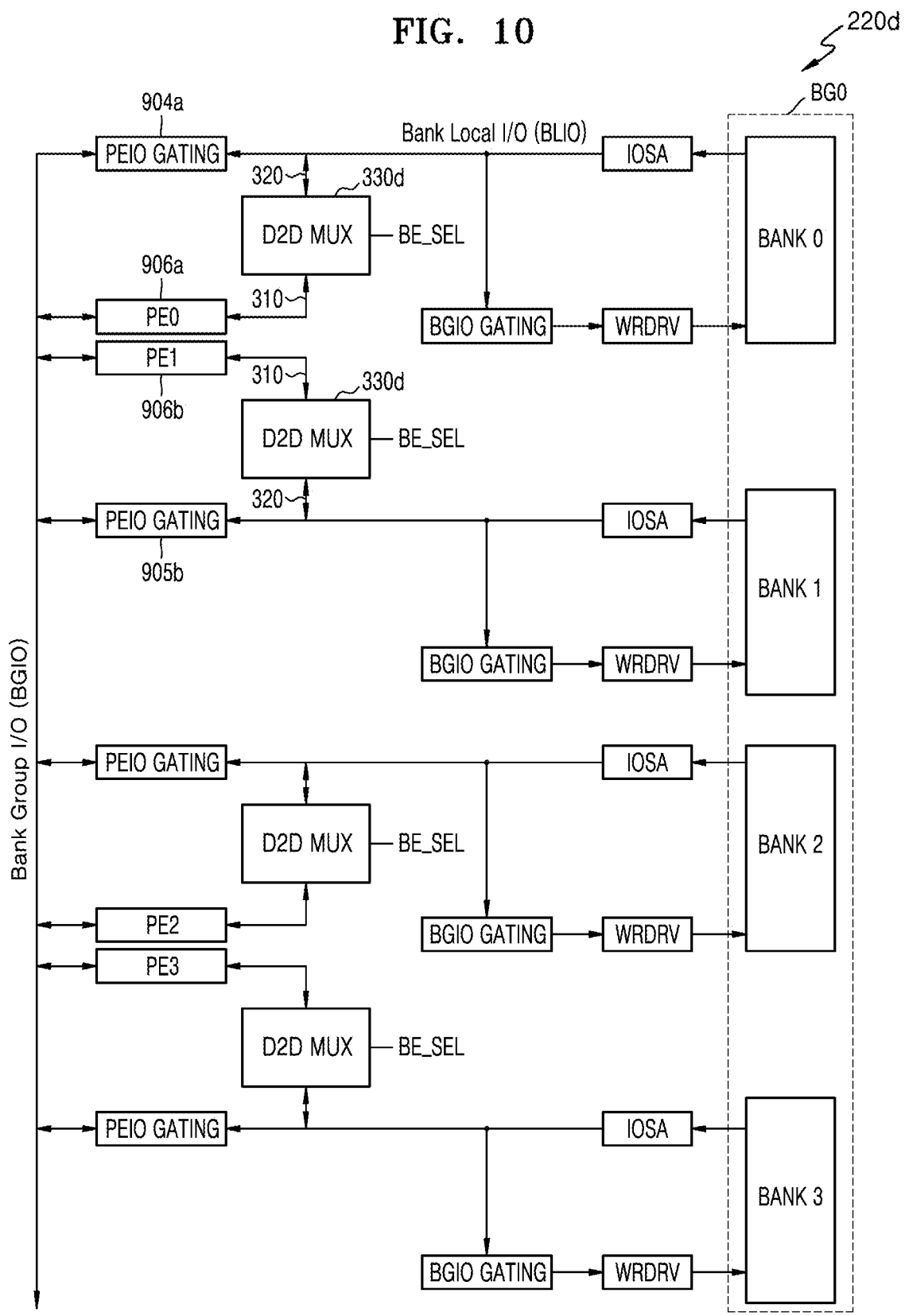
FIG. 10 is a diagram illustrating the arrangement of a D2D MUX in a memory device according to example embodiments of the inventive concepts.

FIG. 10 is a diagram illustrating the arrangement of a D2D MUX 330d in a memory device 220d according to some example embodiments of the inventive concepts. The memory device 220d of FIG. 10 is different from the memory device 220c of FIG. 9 in that PEs are respectively arranged corresponding to the first to third banks BANK0 to BANK3. Hereinafter, differences between FIGS. 9 and 10 will be described.

Referring to FIG. 10, first and second PEs 906a and 906b are individually arranged corresponding to the first and second banks BANK0 and BANK1, respectively. The first PEIO gating circuit 904a may be arranged to control the connection of the bank group IO BGIO and the bank local IO BLIO of the first bank BANK0, and the second PEIO gating circuit 905b may be arranged to control the connection of the bank group IO BGIO and the bank local IO BLIO of the second bank BANK1. The D2D MUX 330d may be connected between the first PE 906a and the first PEIO gating circuit 904a, and between the second PE 906b and the second PEIO gating circuit 905b. Data transferred from the first and second PEs 906a and 906b may be transferred to the D2D MUX 330d through the first data bus 310. The D2D MUX 330d may perform data bus conversion on 256-bit input data in 2-byte units based on a data pass or conversion operation in response to the control signal BE_SEL, and output 256-bit output data to the first and second PEIO gating circuits 904a and 905b through the second data bus 320.

The D2D MUX 330d may be implemented as the D2D MUX 330 of FIGS. 4 and 5A to 5C described above, and the 256-bit input data may split into 16 bytes and be carried on the first data bus 310, and the 256-bit output data may split into 16 bytes and be carried on the second data bus 320. The D2D MUX 330d may exchange between two bytes in 16 bytes of 258 bits of the first data bus 310 and the second data bus 320 according to the logic high level control signal BE_SEL, that is, between first and second bytes, third and fourth bytes, between fifth and sixth bytes, between seventh and eighth bytes, between ninth and tenth bytes, between eleventh and twelfth bytes, between thirteenth and fourteenth bytes, and between fifteenth and sixteenth bytes. The D2D MUX 330d may pass unchanged data from the first to sixteenth bytes of the first data bus 310 to the first to sixteenth bytes of the second data bus 320 according to the logic low level control signal BE_SEL.

Figure 11:
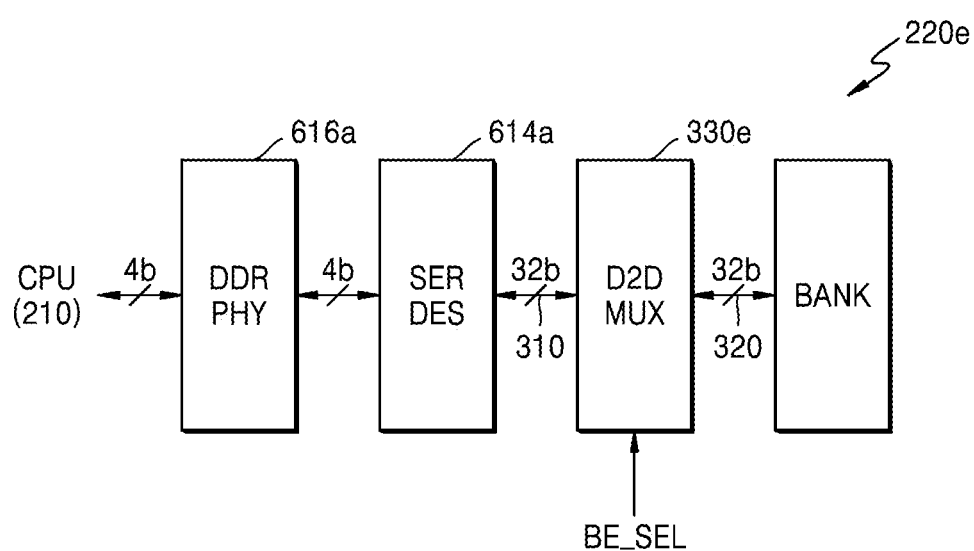
FIG. 11 is a diagram illustrating the arrangement of a D2D MUX in a memory device according to example embodiments of the inventive concepts.

FIG. 11 is a diagram illustrating the arrangement of a D2D MUX 330e in a memory device 220e according to some example embodiments of the inventive concepts. The memory device 220e of FIG. 11 is a stand-alone type dual data rate (DDR) DRAM, and may include PEs performing PIM functions therein.

Referring to FIGS. 2 and 11, in the memory device 220e, the D2D MUX 330e may be disposed between a SERDES region 614a and the bank BANK. A DDR PHY region 616a may receive 4-bit input data from the CPU 210 and transfer the 4-bit input data to the SERDES region 614a. The DDR PHY region 616a may support features of an HBM protocol of the JEDEC standard. The SERDES region 614a may continuously receive 4-bit data of the CPU 210 transferred through the DDR PHY region 616a and convert and output the 4-bit data into 32-bit parallel data through a serial-to-parallel circuit. The 32-bit parallel data output from the SERDES region 614a may split into byte wide and be transferred to the D2D MUX 330e through the first data bus 310. The D2D MUX 330e may perform data conversion on 32-bit input data in units of 2 bytes based on a data pass or conversion operation in response to the control signal BE_SEL, and output 32-bit output data.

The D2D MUX 330e may be implemented as the D2D MUX 330 of FIGS. 4 and 5A to 5C described above, and the 32-bit input data splits into 4 bytes and is carried on the first data bus 310, and the 32-bit output data may be split into 4 bytes and carried on the second data bus 320. The D2D MUX 330e may exchange between two bytes in 4 bytes of 32 bits of the first data bus 310 and the second data bus 320 according to the logic high level control signal BE_SEL, that is, between first and second bytes, and between third and fourth bytes. The D2D MUX 330e may pass unchanged data from the first to fourth bytes of the first data bus 310 to the first to fourth bytes of the second data bus 320 according to the logic low level control signal BE_SEL.

After data bus conversion is performed by the D2D MUX 330e, the second data bus 320 may be coupled to the bank BANK.

Figure 12:
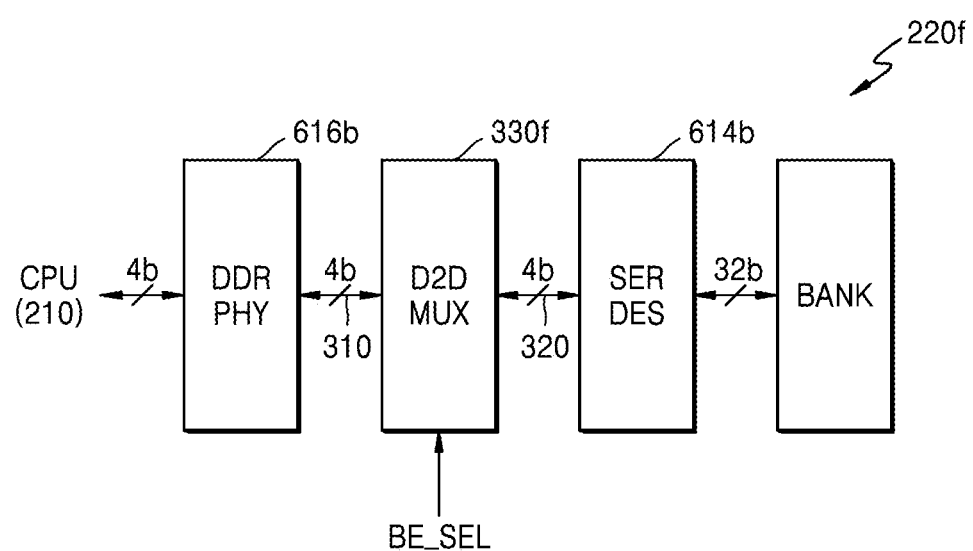
FIG. 12 is a diagram illustrating the arrangement of a D2D MUX in a memory device according to example embodiments of the inventive concepts.

FIG. 12 is a diagram illustrating the arrangement of a D2D MUX 330f in a memory device 220f according to some example embodiments of the inventive concepts. The D2D MUX 330f of FIG. 12 is different from the D2D MUX 330e of FIG. 11 in that the D2D MUX 330f is disposed between a DDR PHY region 616b and a SERDES region 614b. Hereinafter, differences between FIGS. 11 and 12 will be described.

Referring to FIGS. 2 and 12, in the memory device 220f, the DDR PHY region 616b may receive 4-bit input data from the CPU 210 and transfer the 4-bit input data to the D2D MUX 330f through the first data bus 310. For example, in the first data bus 310 of the big-endian format, a first address refers to the most significant (e.g., leftmost) bit of the first data bus 310, and increasing addresses refer to increasingly less significant bits. In contrast, in the second data bus 320 of the little-endian format, the same first address refers to the least significant (e.g., rightmost) bit of the second data bus 320, and increasing addresses refer to increasingly more significant bits.

Figure 13:
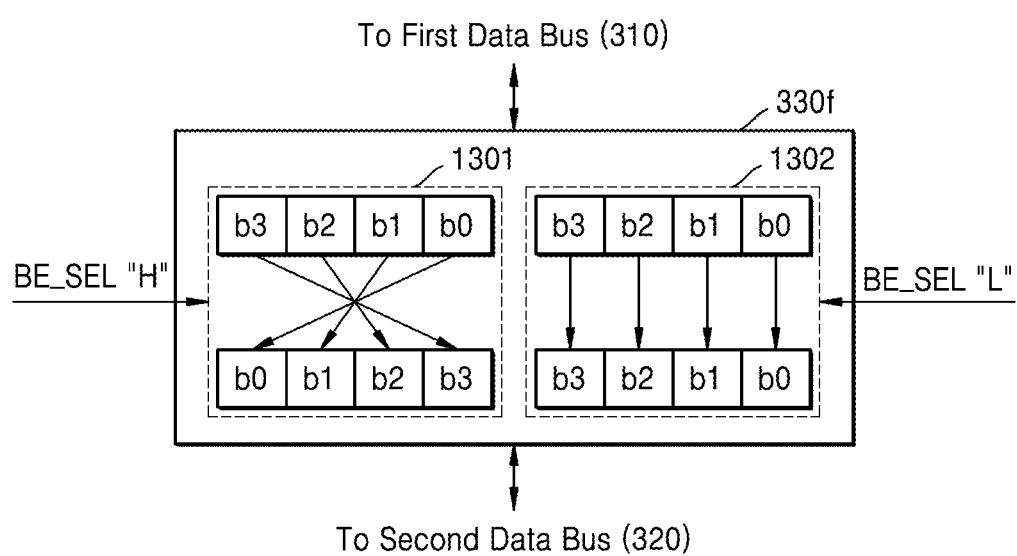
FIG. 13 is a diagram illustrating an operation of the D2D MUX of FIG. 12.

As illustrated in FIG. 13, the D2D MUX 330f may perform a bit pass or bit conversion operation on the 4-bit input data of the first data bus 310 in response to the control signal BE_SEL. The D2D MUX 330f may perform bit swap 1301 according to the logic high level control signal BE_SEL such that b3-b2-b1-b0 bits of the first data bus 310 may be converted into b0-b1-b2-b3 bits and output to the second data bus 320. In contrast, the D2D MUX 330f may perform bit pass 1302 according to the logic low level control signal BE_SEL, such that the b3-b2-b1-b0 bits of the first data bus 310 may be unchanged and output to the second data bus 320 as the b3-b2-b1-b0 bits.

After data bus conversion is performed by the D2D MUX 330f, the second data bus 320 may be coupled to the SERDES region 614b. The SERDES region 614b may continuously receive 4-bit data of the second data bus 320 and convert and output the 4-bit data into 32-bit parallel data through a serial-to-parallel circuit. The 32-bit parallel data output from the SERDES region 614b may be coupled to the bank BANK.

As described above, the data converter 330 may be implemented in hardware, as shown, but not limited to, the examples shown in FIGS. 4-5C, and equivalent hardware implementations.

Any of the remaining elements disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

While the inventive concepts have been particularly shown and described with reference to example embodiments thereof, it will be understood that various changes in form and details may be made therein without departing from the spirit and scope of the following claims.

What is claimed is:
1. A memory device comprising:
   a memory bank;
   a processing element (PE) coupled to the memory bank and configured to perform computation processing;
   a serializer/deserializer (SERDES) region comprising a SERDES configured to perform an operation of parallelizing a serial data stream received from a host device external to the memory device, and perform an operation of serializing a parallel data stream output from the memory bank or the PE; and
   an interface circuit comprising a data transfer path related to the memory bank, the PE, and the SERDES, and configured to allow the memory device to perform data conversion in the data transfer path based on a control signal set in accordance with an endian format of the host device,
   wherein the endian format of the host is one of a big-endian format in which a first byte of date in the data transfer path is ordered before a second byte of the data in the date transfer path, and a little-endian format in which the second byte is ordered before the first byte.
2. The memory device of claim 1, wherein the interface circuit comprises:
   a first input data bus configured to receive a first byte;
   a second input data bus configured to receive a second byte;
   a control signal line configured to receive the control signal;
   a first output data bus;
   a second output data bus; and
   a data bus converter connected to the first and second input data buses, the control signal line, and the first and second output data buses,
   wherein the data bus converter is configured to, in response to a first logic state of the control signal, pass the first byte of the first input data bus to the first output data bus and pass the second byte of the second input data bus to the second output data bus, and, in response to a second logic state opposite to the first logic state of the control signal, reconfigure and transfer the first byte of the first input data bus to the second output data bus and reconfigure and transfer the second byte of the second input data bus to the first output data bus.

3. The memory device of claim 2, further comprising a memory physical layer interface (PHY) region configured to communicate with the host device,
    wherein the interface circuit is disposed between the memory PHY region and the SERDES region, and is configured such that
    when data is input from the host device to the memory device, the first and second input data buses are coupled to the memory PHY region, and the first and second output data buses are coupled to the SERDES region, and
    when the data is output from the memory device to the host device, the first and second input data buses are coupled to the SERDES region, and the first and second output data buses are coupled to the memory PHY region.

4. The memory device of claim 2, wherein the interface circuit is between the SERDES region and the memory bank or the PE, and is configured such that
    when data is input from the host device to the memory device, the first and second input data buses are coupled to the SERDES region, and the first and second output data buses are coupled to the memory bank or the PE, and
    when the data is output from the memory device to the host device, the first and second input data buses are coupled to the memory bank or the PE, and the first and second output data buses are coupled to the SERDES region.

5. The memory device of claim 2, further comprising:
    a bank group comprising a plurality of memory banks;
    a bank group input/output line coupled to the bank group to transfer data between the host device external to the memory device and the bank group;
    a first bank local input/output line coupled to a first memory bank configured to transfer data provided to the first memory bank and data read from the first memory bank; and
    a second bank local input/output line coupled to a second memory bank configured to transfer data provided to the second memory bank and data read from the second memory bank.

6. The memory device of claim 5, wherein the PE is shared by the first and second memory banks,
    wherein the interface circuit is between the SERDES region and the bank group input/output line, and is configured that
    when data is input from the host device to the memory device, the first and second input data buses are coupled to the SERDES region, and the first and second output data buses are coupled to the bank group input/output line, and
    when the data is output from the memory device to the host device, the first and second input data buses are coupled to the bank group input/output line, and the first and second output data buses are coupled to the SERDES region.

7. The memory device of claim 5, further comprising:
    a first PE coupled to the first memory bank; and
    a second PE coupled to the second memory bank,
    wherein the interface circuit is between the first PE and the first bank local input/output line, and between the second PE and the second bank local input/output lines, and is configured such that
    when data is input from the host device to the memory device, the first and second input data buses are coupled to the first and second PEs, respectively, and the first and second output data buses are coupled to the first and second bank local input/output lines respectively, and
    when the data is output from the memory device to the host device, the first and second input data buses are coupled to the first and second bank local input/output lines respectively, and the first and second output data buses are coupled to the first and second PEs respectively.

8. The memory device of claim 1, wherein the control signal is provided in a mode register set (MRS) of the memory device or provided according to a state of a non-volatile memory device inside the memory device.

9. The memory device of claim 1, wherein the memory device is a high bandwidth memory (HBM) further comprising:
    a buffer die comprising the SERDES region; and
    a dynamic random access memory (DRAM) die comprising the memory bank and the PE.

10. A memory device comprising:
    a memory bank;
    a serializer/deserializer (SERDES) region comprising a SERDES configured to perform an operation of parallelizing a serial data stream received from a host device external to the memory device, and perform an operation of serializing a parallel data stream output from the memory bank; and
    an interface circuit comprising a data transfer path related to the memory bank and the SERDES, coupled to the SERDES region, and configured to allow the memory device to perform data conversion in the data transfer path based on a control signal set in accordance with an endian format of the host device,
    wherein the endian format of the host is one of a big-endian format in which a first byte of date in the data transfer path is ordered before a second byte of the data in the date transfer path, and a little-endian format in which the second byte is ordered before the first byte.

11. The memory device of claim 10, wherein the interface circuit comprises:
    first data lines through which first data bits of a first endian format are transferred;
    a control signal line configured to receive the control signal;
    second data lines; and
    a data converter connected to the first data lines, the control signal line, and the second data lines,
    wherein the data converter is configured to, in response to a first logic state of the control signal, pass the first data bits of the first data lines to the second data lines in the first endian format and, in response to a second logic state opposite to the first logic state of the control signal, reconfigure the first data bits of the first data lines to a second endian format different from the first endian format and transfer the first data bits to the second data lines.

12. The memory device of claim 11, further comprising a memory physical layer interface (PHY) region configured to communicate with the host device, wherein the interface circuit is between the memory PHY region and the SERDES region, and is configured such that
when data is input from the host device to the memory device, the first data lines are coupled to the memory PHY region, and the second data lines are coupled to the SERDES region, and
when the data is output from the memory device to the host device, the first data lines are coupled to the SERDES region, and the second data lines are coupled to the memory PHY region.

13. The memory device of claim 11, wherein the interface circuit is between the SERDES region and the memory bank, and is configured such that
when data is input from the host device to the memory device, the first data lines are coupled to the SERDES region, and the second data lines are coupled to the memory bank, and
when the data is output from the memory device to the host device, the first data lines are coupled to the memory bank, and the second data lines are coupled to the SERDES region.

14. The memory device of claim 10, wherein the control signal is provided in a mode register set (MRS) of the memory device or provided according to a state of a nonvolatile memory device inside the memory device.

15. The memory device of claim 10, wherein the memory device is a dual data rate (DDR) DRAM further comprising a processing element (PE) coupled to the memory bank and configured to perform computation processing.

16. A method of operating a memory device comprising an interface circuit configured to adjust an endian format between a host device and the memory device, the method comprising:

receiving a serial data stream of a first endian format from the host device;
parallelizing the serial data stream into first data; and
converting the serial data stream to a second endian format of the memory device or converting the parallelized first data to the second endian format based on a control signal, the converting being performed by the interface circuit,
wherein the endian format is one of a big-endian format in which a first byte of data is ordered before a second byte of the data, and a little-endian format in which the second byte is ordered before the first byte.

17. The method of claim 16, further comprising:
outputting a parallel data stream from a memory bank;
serializing the parallel data stream into second data; and
converting the parallel data stream to the first endian format or converting the serialized second data to the first endian format, the converting being performed by the interface circuit.

18. The method of claim 16, further comprising providing the parallelized first data to a memory bank or a processing element (PE) coupled to the memory bank to perform computation processing.

19. The method of claim 18, wherein the converting of the parallelized first data to the second endian format is performed when the interface circuit is coupled to a data transfer path related to the memory bank or the PE.

20. The method of claim 16, further comprising providing the control signal in a mode register set (MRS) of the memory device or according to a state of a nonvolatile memory device inside the memory device.

* * * * *